BEST AVAILABLE COPY

United States Patent

[11] 3,591,733

[72] Inventor Louis E. Pflughaupt
San Jose, Calif.
[21] Appl. No. 828,547
[22] Filed May 28, 1969
[45] Patented July 6, 1971
[73] Assignee International Business Machines Corporation
Armonk, N.Y.

[54] MAGNETIC COUPLING COMPENSATION MEANS FOR A MULTIELEMENT MAGNET HEAD
8 Claims, 4 Drawing Figs.

[52] U.S. Cl. ........ 179/100.2
K, 179/100.2 C
[51] Int. Cl. ........ G11b 5/44
[50] Field of Search ........ 179/100.2
C, 100.2 K; 340/174.1 B, 174.1 F

[56] References Cited

UNITED STATES PATENTS

| | | | |
|---|---|---|---|
| 2,839,613 | 6/1958 | Greene | 179/100.2 |
| 3,401,231 | 9/1968 | Baldwin | 178/6.6 A |
| 3,107,347 | 10/1963 | Muss | 340/174.1 |
| 3,287,713 | 11/1966 | Porter | 340/174.1 |

FOREIGN PATENTS

| | | | |
|---|---|---|---|
| 803,624 | 6/1956 | England | 179/100.2 |

*Primary Examiner*—Stanley M. Urynowicz, Jr.
*Assistant Examiner*—Robert S. Tupper
*Attorneys*—Hanifin and Jancin and John H. Holcombe

ABSTRACT: An arrangement for winding the coils of multigap magnetic heads to attenuate readback crosstalk between multiple tracks. A bifilar read coil, both filaments being connected together to provide opposite phases, is supplied on each element forming a gap of the multigap head. Additionally, each filament of the coil is separately wound on a different one of the adjacent elements out of phase with the leakage flux coupling. The resultant three-terminal winding is connected to a center-tapped differential amplifier. Hence, a deliberate one-sided crosstalk overcompensation results in a common mode coupling signal reduced in that the common mode rejection of the differential amplifier attenuates the net coupling signal.

*INVENTOR.*
LOUIS E. PFLUGHAUPT

BY John H. Holcombe

ATTORNEY

MAGNETIC COUPLING COMPENSATION MEANS FOR A MULTIELEMENT MAGNET HEAD

BACKGROUND OF THE INVENTION

1. Field of the Invention

This invention relates to the reproduction of electrical signals from a travelling magnetic medium, and more particularly, to crosstalk compensation for multigap magnetic heads.

2. Description of the Prior Art

Magnetic recording devices, such as tape, discs, strips and drums, are rapidly gaining favor as low cost high capacity data storage apparatus. Almost all these devices employ a plurality of parallel magnetic recording tracks. However, two types of head implementation are employed. In one instance, a single head element is shared by several tracks, the head being moved to a selected track in order to read the desired data. The other implementation is of fixed heads employing one nonmovable head element for each track.

In order to reduce or eliminate wear of the head and of the magnetic medium in data storage systems, and particularly drum and disc files, each head is made a part of a large slider assembly which is aerodynamically designed to fly a specific distance away from the magnetic recording medium. In the ideal situation, no contact occurs between the head and the recording medium. The slider, however, requires a definite amount of lateral space. Hence, in the fixed head files, it is often difficult to find sufficient space for all of the separate heads and ingenious geometric arrangements of heads are often employed to fit the heads within the limited space. Each head also comprises a significant cost, particularly when including a slider with a precision aerodynamic bearing surface. Shared head files reduce the cost for a given amount of data by reducing the number of heads employed. The trade-off, however, is that the time required to access a given portion of data on a given track is significantly increased because the head must be mechanically moved to the desired track. Hence, significant effort has been directed toward reduction in cost of fixed head files.

One approach is the provision of multiple gap heads with parallel elements closely spaced together in one assembly. For example, such a head could employ one common leg comprising a single block of ferrite and a plurality of individual legs, or elements, each forming a separate gap with the common leg. Read/write or separate record and readback coils are then wound about the individual elements to cooperate with the corresponding gap.

A severe problem exists during the read, or playback, operation, however, from the magnetic coupling between adjacent elements due to the closely spaced nature thereof. While reading the desired associated track, the read coil may also respond to signals from the immediately adjacent tracks which are coupled to the individual element and the operating read coil due to the mutual inductance of adjacent elements.

At low frequencies, such as those encountered in sound recording or low frequency data recording where a large number of bifilar turns (10 or more) may be used for each read coil, a number (typically about 7 percent) of bifilar compensating turns comprising an extension of each coil may be wound on each adjacent element to cancel the coupling. However, in high frequency data recording, the number of bifilar turns of the read coil must be reduced to a small number (less than 10) to reduce the coil inductance and increase the frequency response. Even a single bifilar turn about each adjacent element would overcompensate any coupling therefrom and thereby introduce erroneous signals to the read amplifier.

SUMMARY

An object of the present invention is therefore to provide means for attenuating readback crosstalk in multiple gap magnetic heads operating at high frequency.

An advantage of the present invention is that it can be used in conjunction with bifilar compensating turns to afford a finer control of coupling compensation in larger, lower frequency coils; i.e., several bifilar turns plus one single filament turn could be wound around adjacent elements.

Briefly, the invention comprises playback magnetic coupling compensation apparatus for a high frequency multielement magnetic head, each element having a gap. A differential read amplifier is provided having three input terminals, two of opposite phase, and a common terminal. A bifilar playback signal winding is provided on one of the elements of the magnetic head. Two auxiliary windings are also provided, each comprising a portion of a different filament of the bifilar winding. Each of the two auxiliary windings are wound on an element immediately adjacent and on opposite sides of the above element, each auxiliary winding being wound so as to be out of phase with a leakage flux coupling from the adjacent element to the signal winding of the above element. Each filament of the bifilar winding is connected to a separate one of the opposite phase input terminals of the differential amplifier at one end and both are connected to the common terminal at the other end, so that the playback magnetic flux supplies opposite phase signal inputs to the opposite phase input terminals of the differential amplifier. The other elements of the multielement head are similarly wound and terminated.

DESCRIPTION OF THE PREFERRED EMBODIMENT

Figure 1:
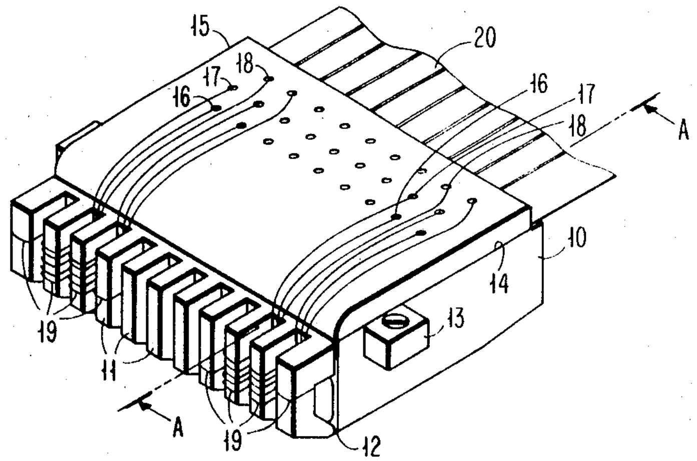
FIG. 1 comprises a perspective illustration of a multigap, parallel magnetic head.

With reference to FIG. 1, an example of a multigap, parallel, magnetic head is illustrated. This particular head and its method of manufacture are described in copending patent application Ser. No. 737,759, by Erik R. Solyst, filed June 17, 1968, and assigned in common with the present application. Briefly, the head includes a block of ferrite 10 forming both a common leg and the aerodynamic slider, and a plurality of individual elements 11, each forming a separate gap 12 with the common leg. The individual elements 11 are bonded to the common leg 10 by glass, for example. Hence, a nonmagnetic gap 12 is formed between each element and the common leg for transducting with a corresponding track on a medium immediately underlying the gap. A suspension mounting bar 13 is fastened in a groove that has been machined in the top surface 14 of the block 10 so that the head assembly may be mounted to a flexure of a head support assembly. An integrated circuit module 15 is attached to the top surface 14 of the common leg and slider 10. The integrated circuit module 15 is provided with a set of terminals 16, 17 and 18 for each of the active elements 11 of the head. A coil 19 is wound for each of the active elements 11 and connected to the three terminals 16, 17 and 18. Each coil 19 includes a winding on the corresponding element and auxiliary single turn windings on adjacent elements, as will be described hereinafter. The terminals 16, 17 and 18 comprise inputs to an integrated circuit diode switching matrix contained within circuit module 15. The diode switching matrix comprises a conventional means in integrated circuit form for selecting a desired set of three terminals 16—18 except that it is located at the transducer rather than attached to the machine frame. This allows a reduction in the number of conductors from the transducer to those in flexible strip 20. The flexible strip connects the diode switching matrix to a differential read amplifier located in a fixedly mounted position with respect to the main frame of the file. The particular diode switching matrix per se forms no part of the present invention and therefore no detailed description thereof will be made.

Figure 2:
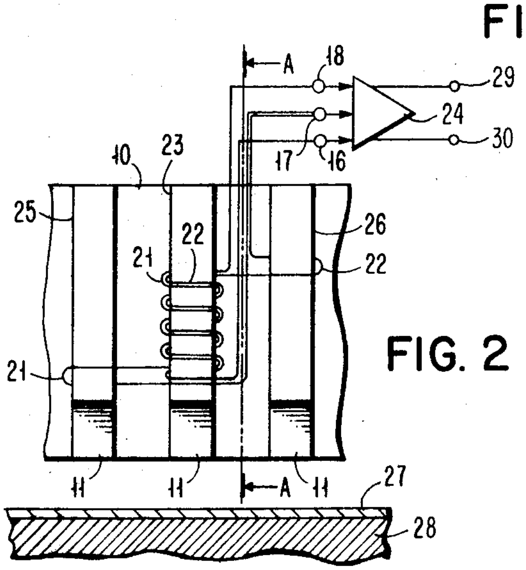
FIG. 2 comprises a frontal illustation of a portion of the magnetic head of FIG. 1 together with the apparatus of the present invention to provide for playback compensation of one of the elements of the head.
Figure 3:
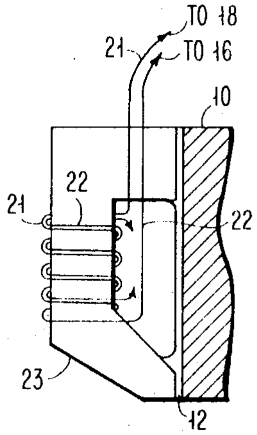
FIG. 3 is a cutaway illustration of the apparatus of FIG. 2 taken at section AA thereof.

Referring now to FIGS. 2 and 3, the specific arrangement of the coils 19 comprising the present invention is illustrated. A bifilar coil comprising two filaments 21 and 22 is wound about a leg 23 comprising one of the elements 11 of the magnetic head. This coil is called a "main winding." Excluding reference to the diode matrix 15, filament 21 of the bifilar coil is connected to terminal 18 comprising an input to differential amplifier 24. It, together with filament 22, is wound about leg 23 several times, comprising several turns, and then filament 21 alone is wound a single turn about leg 25 comprising the immediately adjacent element. This winding about leg 25 is called an "auxiliary winding." The filament 21 is then connected, via terminal 17 to the center, or ground, input of differential amplifier 24. Therefore, voltage induced in the portion of coil comprising filament 21 is applied between terminals 17 and 18 of the differential amplifier 24.

Filament 22 is also connected, via terminal 17, to the center, or ground, input of amplifier 24. The filament is then wound a single turn about leg 26 comprising the other element 11 immediately adjacent the element formed by leg 23. This winding comprises another auxiliary winding. Filament 22 is then wound, together with filament 21, several turns about leg 23 and then connected, via terminal 16, to the opposite phase input to differential amplifier 24.

The recorded track in the magnetic material 27 on substrate 28 which is immediately underlying and associated with the gap 12 of leg 23 generates a magnetic flux through leg 23 and through the common leg 10. This magnetic flux generates a voltage across both filaments 21 and 22. The windings are such that the magnetic flux generates a voltage across filament 21 which in turn provides a signal between terminals 17 and 18 as an input to differential amplifier 24 of a first phase. The same flux generates a voltage across filament 22 between terminals 17 and 16 as an input to amplifier 24 of the opposite phase from that of filament 21. Hence, the resultant signals an input to differential amplifier 24 comprise a net signal between terminals 18 and 16 equal to approximately twice the amplitude of the signal attributed to each filament individually. This signal is amplified by the differential amplifier 24 and is supplied to output terminals 29 and 30.

Each of the adjacent elements, comprising legs 25 and 26, are similarly associated with immediately underlying recorded tracks in the magnetic surface 27. These tracks likewise generate magnetic flux in the associated legs and in the common leg 10. Since legs 25 and 26 are closely adjacent to the leg 23 of the selected coil 19, some of this magnetic flux leaks between and is coupled through leg 23. Unless coupling compensation is provided, this magnetic flux would also generate a voltage across both the filaments 21 and 22 comprising the coil 19 in a manner identical to the primary read voltage generated by the desired track. The opportunity for signal distortion and erroneous detection of data is therefore apparent.

This leakage flux is not peculiar to the multielement head shown here by example (with its common leg 10), but is found in all closely adjacent magnetic element constructions.

Figure 4:
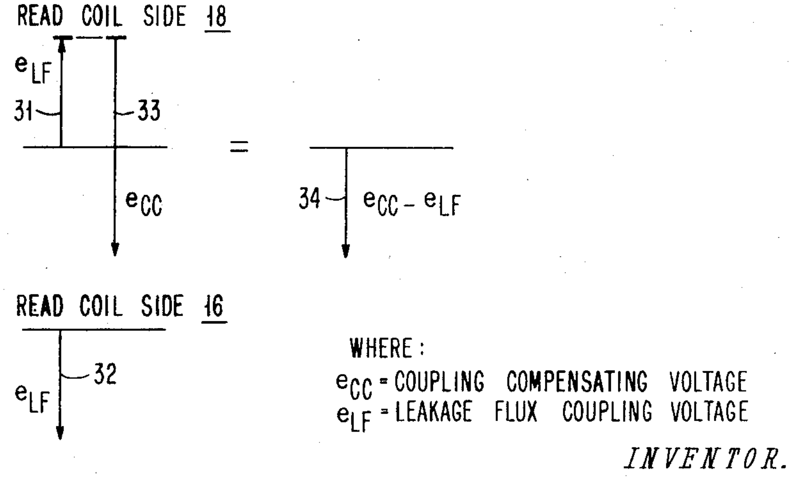
FIG. 4 diagrammatically illustrates the electrical vectors obtained by operation of the present invention.

Referring additionally to FIG. 4, the compensation for the described leakage flux accomplished by the disclosed apparatus is described.

As stated, the leakage flux from the track in cooperative relationship with leg 25 generates voltages across both filaments 21 and 22 of the coil 19 for leg 23. The amplitude and phase of the resultant signals due to leakage flux alone as applied to terminals 18 and 16, respectively, are shown diagrammatically by vectors 31 and 32. As with the normal read voltage from the track associated with leg 23, this leakage signal is of opposite phase as applied between terminals 17 and 18 as compared to the signal between terminals 17 and 16. Without compensation, this erroneous signal would be transmitted across outputs 29 and 30 of the differential amplifier 24.

However, the filament 21 is additionally wound a single turn about the leg 25 before being connected to the terminal 17. This turn causes the flux generated in leg 25 by the track associated therewith to generate an additional small proportional voltage across filament 21 to be applied to the amplifier 24 to compensate the signal caused in the coil by the leakage flux. The compensation signal induced across filament 21 and applied between terminals 18 and 17 is illustrated by vector 33 in FIG. 4.

The auxiliary winding of filament 21 about leg 25 is arranged such that the signal phase generated between terminal 17 and 18 by the direct flux in leg 25 is opposite in phase to the signal generated in the same filament by the leakage flux from leg 25 as generated in the filament by the leakage flux from leg when wound about leg 23, the main winding. This relationship is illustrated by the relationship between vectors 31 and 33. The net difference between the signal generated by the leakage flux and the signal generated by the auxiliary winding is represented by vector 34. This represents the net erroneous signal generated between terminals 17 and 18. As previously described, the signal generated by the leakage flux from leg 25 on filament 22 and applied between terminal 17 and 16 is shown by vector 32. The auxiliary winding is arranged such that the direct compensation signal 33 is approximately twice the amplitude of the leakage signal 31. Hence, the net compensated signal 34 from filament 21 and the leakage flux signal 32 from filament 22 are of approximately the same amplitude and are of the same phase. There is thus no net difference between the erroneous signals appearing across inputs 17 and 18 and across inputs 17 and 16. The differential amplifier tends to reject such common mode signals and therefore provides attenuation of the net erroneous signal across output terminals 29 and 30.

The identical procedure occurs for a magnetic signal generated by the track associated with leg 26, the compensating signal derived from the auxiliary winding around leg 26 by filament 22 resulting in a net erroneous signal across terminal 17 and 16 of the same phase and approximately the same amplitude as the erroneous leakage flux signal generated across terminals 17 and 18 by filament 21.

In this manner, the sole output signal across terminals 29 and 30 generated by the differential amplifier 24 is the desired read signal generated by filaments 21 and 22 from the magnetic flux in leg 23.

The circuit connections and the directions and order of the specific windings may be altered in accordance with the present invention so long as the relative phases of signals supplied to the differential amplifier 24 remain unchanged from that described.

The ideal situation, as stated, is for the compensation voltage from the auxiliary winding to be exactly twice the leakage flux voltage from the main winding portion of the filament, and also for the common mode rejection of the amplifier to be very large. However, the system is workable despite reasonable deviations from the ideal depending upon the threshold levels of the recording detection circuitry.

The present invention thus halves the minumum compensating effect achievable with bifilar compensating windings, i.e., doubles the degree of perfection with which signal crosstalk can be eliminated. Some additional refinement in compensation can be achieved with the present invention by adjusting the auxiliary winding about the adjacent element to appropriately alter its effectiveness.

The disclosed apparatus has been treated only from the playback standpoint. The same coils may be employed for writing, but write coupling is not as critical in that the hysteresis nature of the magnetic material 27 imposes a relatively high threshold which must be exceeded before the write signal can be written on an adjacent track by leakage flux coupling or by an auxiliary winding.

Further, writing into the compensated coil 19 single ended should be no worse in net write coupling than the uncompensated coil, if the read compensation is close to ideal. This can be visualized by referring to vectors 31, 33 and 34, and considering the reciprocal nature of writing flux and reading flux.

While the invention has been particularly shown and described with reference to a preferred embodiment thereof, it will be understood by those skilled in the art that the foregoing and other changes in form and details may be made therein without departing from the spirit and scope of the invention.

I claim:

1. Apparatus including a multielement magnetic head assembly having a series of closely and uniformly spaced magnetic elements and a single air bearing magnetic body disposed adjacent to said magnetic elements for forming a multiplicity of transducing gaps, in which direct magnetic flux signals are sensed and undesirable leakage flux occurs, comprising:

a bifilar main winding signal means having a predetermined number of turns encompassing at least one of said elements;

a first filament of said bifilar main winding signal means providing an auxiliary winding that is wound about a first element adjacent to said at least one element;

the second filament of said bifilar main winding signal means providing an auxiliary winding that is wound about a second element adjacent to said at least one element;

the ratio of the number of turns of each of said first and second filaments relative to the number of turns of said bifilar main winding signal means being a fraction; and a differential amplifier having three input terminals, comprising a common terminal and two terminals of opposite phase with respect to said common terminal, and having two output terminals, said first and second filaments being connected to said common terminal, said first filament being connected to one of said opposite phase terminals, and said second filament being connected to the other one of said opposite phase terminals.

2. Apparatus as in claim 1, including a plurality of said bifilar signal means, each coupled to one of a corresponding plurality of said magnetic elements; and switching means intermediate said plurality of bifilar signal means and said differential amplifier for selectively connecting a desired one of said bifilar signal means to said differential amplifier, thereby selecting a desired magnetic gap for transducing operation.

3. Apparatus as in claim 1, wherein each of said first and second filaments constitute a single turn about its respective adjacent magnetic element.

4. Apparatus as in claim 1, wherein the voltage signal across said first filament that is developed by direct magnetic flux associated with the transducing gap of said at least one element is opposite in phase to the voltage signal across said second filament that is developed by the same magnetic flux.

5. Apparatus as in claim 1, wherein the net signal between said two input terminals is approximately twice the amplitude of the signal between one of said two terminals and said common terminal.

6. Apparatus as in claim 1, wherein the transducing gap associated with an adjacent element generates leakage flux that couples to said at least one element.

7. Apparatus as in claim 6, wherein said first and second filaments are wound so that the signals generated by the direct magnetic flux and by the leakage flux are opposite in phase.

8. Apparatus as in claim 7, wherein said auxiliary windings are wound so that a compensation signal is generated having approximately two times the amplitude of the leakage flux signal, thereby providing a net compensation signal having approximately the same amplitude and phase as the leakage flux signal.